United States Patent
Sandock et al.

(10) Patent No.: US 10,002,321 B2
(45) Date of Patent: Jun. 19, 2018

(54) CONNECTABLE DEVICES AND INITIATION MECHANISMS

(71) Applicant: Dock Technologies Inc., Madison, WI (US)

(72) Inventors: Sarah R. Sandock, Milwaukee, WI (US); Nicholas S. Levin, Madison, WI (US); Marcos Martinez Argudo, Madison, WI (US)

(73) Assignee: Dock Technologies Inc., Madison, WI (US)

( * ) Notice: Subject to any disclaimer, the term of this patent is extended or adjusted under 35 U.S.C. 154(b) by 0 days. days.

(21) Appl. No.: 15/410,546

(22) Filed: Jan. 19, 2017

(65) Prior Publication Data

US 2017/0206447 A1   Jul. 20, 2017

Related U.S. Application Data

(60) Provisional application No. 62/281,021, filed on Jan. 20, 2016.

(51) Int. Cl.
*G06K 19/07* (2006.01)
*G06K 19/077* (2006.01)
(Continued)

(52) U.S. Cl.
CPC ... *G06K 19/07743* (2013.01); *G06K 19/0776* (2013.01); *G06K 19/07762* (2013.01);
(Continued)

(58) Field of Classification Search
CPC ......... G06K 19/0776; G06K 19/07762; G06K 19/07779; G06K 19/07743
(Continued)

(56) References Cited

U.S. PATENT DOCUMENTS 4,973,944 A * 11/1990 Maletta ................. G06K 19/04
                                                    340/539.1
5,973,598 A    10/1999 Beigel
(Continued)

OTHER PUBLICATIONS

International Search Report and Written Opinion from PCT application PCT/US2017/014150 dated May 4, 2017 (7 pages).

*Primary Examiner* — Daniel Hess
(74) *Attorney, Agent, or Firm* — Fish & Richardson P.C.

(57) ABSTRACT

Various embodiments related to activatable devices attachable to an object, permanent activation mechanisms, permanent connections, and activatable RFID devices are described. In one embodiment, a device may include an electrical load that is activated when first and second electrical traces are placed into electrical communication when a connector is attached to an object. In another embodiment, an activation mechanism includes first and second electrical contacts that are connected when the first electrical contact is displaced towards the second electrical contact and held in place by an adhesive layer. In yet another embodiment, a communication device includes first and second electrical contacts that either disable or enable the device when they are in the open and closed configurations respectively. In another embodiment, a device may include a permanent connector that once placed in the connected state irreversibly activates or enables the device.

23 Claims, 6 Drawing Sheets

(51) Int. Cl.
*H01Q 1/27* (2006.01)
*H01R 4/04* (2006.01)
*H01R 13/627* (2006.01)

(52) U.S. Cl.
CPC ....... *G06K 19/07779* (2013.01); *H01Q 1/273* (2013.01); *H01R 4/04* (2013.01); *H01R 13/627* (2013.01)

(58) Field of Classification Search
USPC ........................................ 235/492; 340/572.9
See application file for complete search history.

(56) References Cited

U.S. PATENT DOCUMENTS

| | | | |
|---|---|---|---|
| 2003/0173408 A1* | 9/2003 | Mosher, Jr. ............ | A61B 5/117 235/492 |
| 2004/0189470 A1* | 9/2004 | Girvin ................ | G06K 19/0739 340/568.2 |
| 2007/0017136 A1 | 1/2007 | Mosher, Jr. et al. | |
| 2007/0120687 A1* | 5/2007 | Lerch ..................... | G06K 19/04 340/572.9 |
| 2015/0041547 A1* | 2/2015 | Sofoulis ................ | G07B 15/00 235/492 |

\* cited by examiner

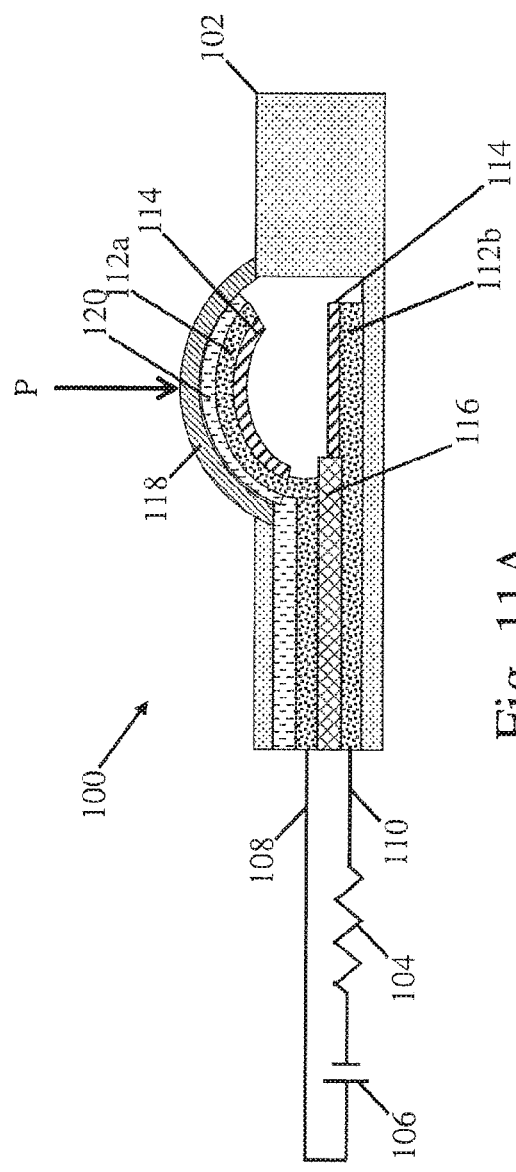
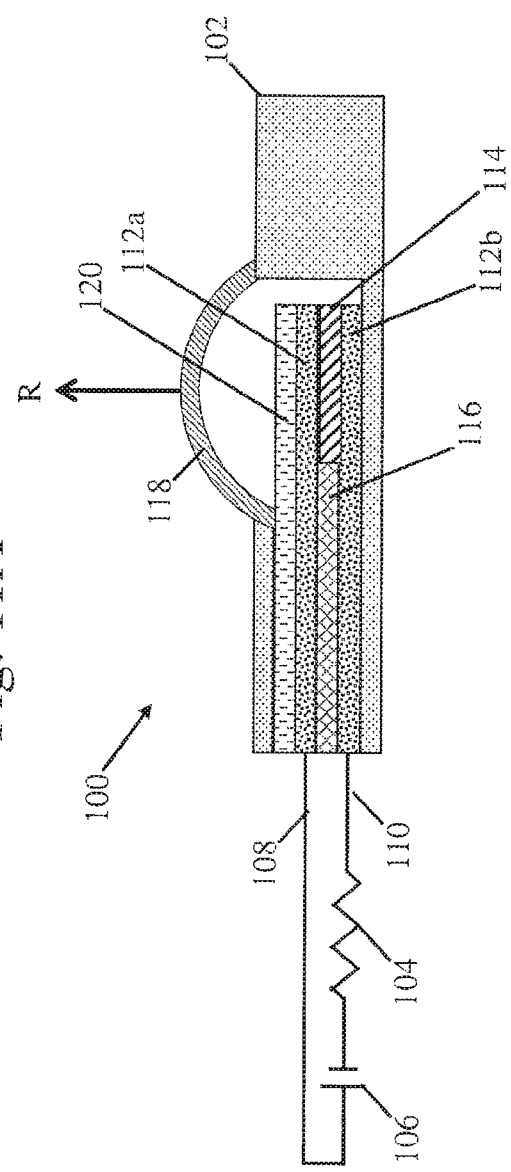

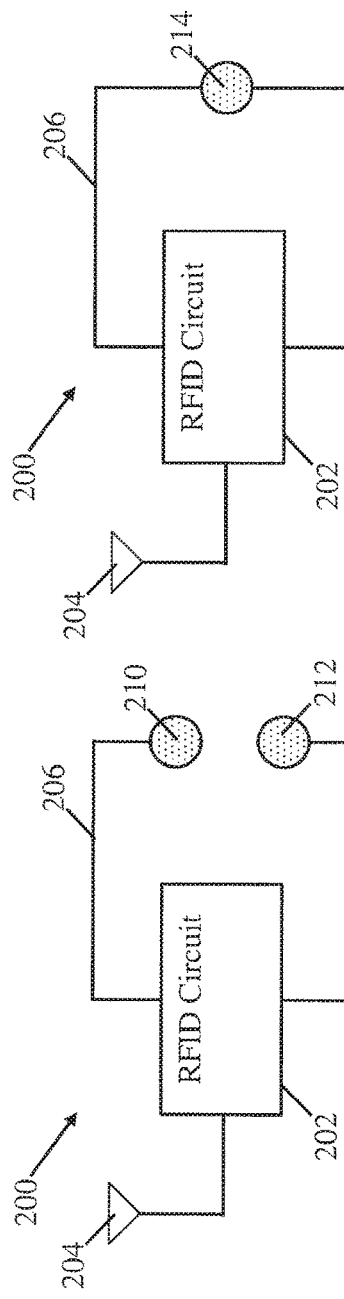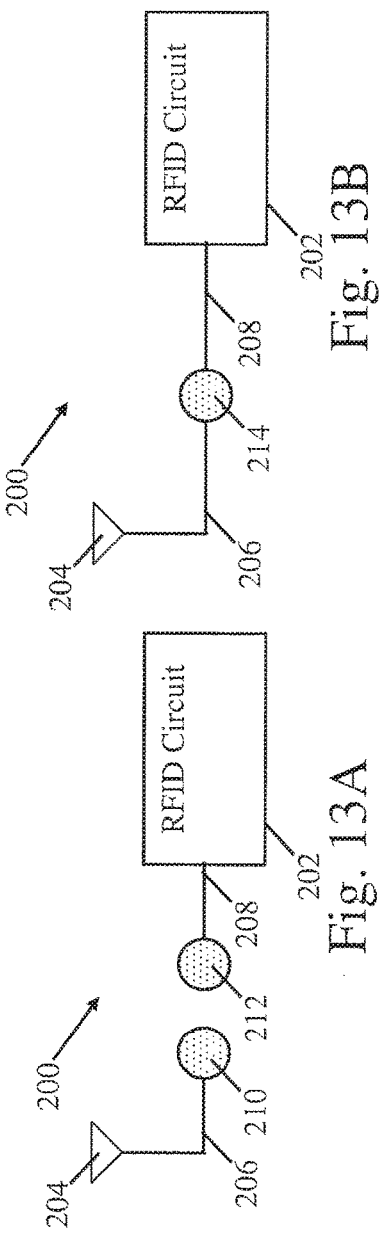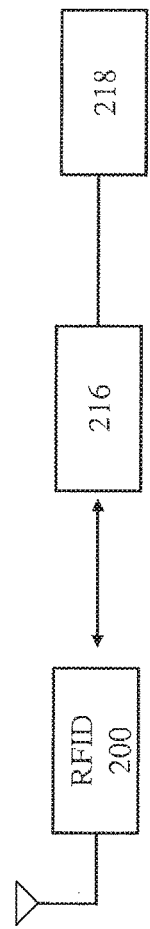

CONNECTABLE DEVICES AND INITIATION MECHANISMS

PRIORITY CLAIM

This application claims priority to U.S. Provisional Application 62/281,021, filed on Jan. 20, 2016, the entire content of which is incorporated herein by reference.

TECHNICAL FIELD

Disclosed embodiments are related to connectable devices initiation mechanisms.

BACKGROUND

Many devices rely on user compliance or require a user to appropriately choose when certain actions and/or processes take place. However, many problems may result from a lack of user compliance, user tampering, lack of auditability, lack of accountability, a system being activated at the wrong time, and/or a system being activating at for a task that is not otherwise documented. This lack in accuracy and/or compliance presents issues in situations that require high reliability, accurate documentation, and/or are high risk situations. For examples, in supply chains an employee must scan a perishable product into an inventory system. If the perishable product is not scanned into the system, the inventory may be compromised and the product might disappear or expire prior to use for many reasons. Alternatively, if the perishable product is not scanned at the right time, the expiration date of the perishable product may not be properly accounted for especially if it is a pharmaceutical. In another example, such as in healthcare settings, some factors for preventing infection and hospital penalties are based on the user's entry to a system and the time to intervention from their entry. However, many times the acute nature of a subject's condition leads caregivers to give a low prioritization to documentation and other long term or macro benefiting actions given the need to take care of the subject immediately. Due to this and other factors, the time of entry into a hospital might not be documented at all, done late, or done retroactively by guessing at the time hours to months after the fact. However, without complete and/or accurate documentation, critical quality, life-saving interventions, and/or payment processes may not be possible to implement properly.

SUMMARY

In one aspect, a radio frequency identification (RFID) device includes an antenna configured to support radio frequency (RF) communications, and circuitry coupled to the antenna, wherein the circuitry configured to send and receive RF communications using the antenna. The RFID device also includes an activation mechanism including a first electrical contact and a second electrical contact. The activation mechanism is configured such that in a first configuration of the activation mechanism, the circuitry is electrically connected to the antenna through the first and second electrical contacts to enable RF communications using the antenna, and in a second configuration of the activation mechanism, an electrical connection between the antenna and the circuitry through the first and second electrical contacts is insufficient for supporting RF communications through the antenna.

In some embodiments, the activation mechanism may be configured to allow the RFID device to be moved from the second configuration to the first configuration and resist the RFID device from being moved from the first configuration to the second configuration. In some embodiments, the activation mechanism may include a wristband. In some embodiments, the circuitry may include a passive RFID tag. In some embodiments, the circuitry may include an active RFID tag that is powered by a power source. In some embodiments, the RFID device may include a display. In some embodiments, the display may be configured to present an output of a timer.

In some embodiments, the circuitry may include a power source that is configured to provide operating power to at least one of: (i) a portion of the circuitry and (ii) the antenna. In some embodiments, the circuitry may further include a switch powered by the power source, the switch disposed such that a depletion of the power source causes the switch to disconnect a first portion of the circuitry from a second portion of the circuitry. In some embodiments, the switch may include a metal-oxide semiconductor field effect transistor (MOSFET). In some embodiments, a gate of the MOSFET may be driven by the power source. In some embodiments, the activation mechanism may include a snap connector, and the first electrical contact and the second electrical contact are disposed on corresponding portions of the snap connector configured to attach to one another in a mating configuration. In some embodiments, the first electrical contact may include a snap connector and the second electrical contact includes a portion receivable by the snap connector. In some embodiments, at least one of the first electrical contact and the second electrical contact may be integrated in a body of the RFID device. In some embodiments, in the second configuration of the RFID device, the first electrical contact and the second electrical contact may be electrically separated by an insulator. In some embodiments the insulator may be integrated with a packaging component of the RFID device and may be removable from the RFID device with the packaging component.

In another aspect, a radio frequency identification (RFID) device includes a RFID tag and an attachment mechanism including two mating portions configured to couple with one another in a first configuration to be attached to an object. The two mating portions include a first electrical contact and a second electrical contact, respectively, such that in the first configuration of the attachment mechanism, an electrical connection is formed through the first and second electrical contacts to enable the RFID tag, and in a second configuration of the activation mechanism, an electrical separation of the first and second electrical contacts disables the RFID tag.

In some embodiments, the RFID tag may be a passive RFID tag. In some embodiments, the RFID tag may be an active RFID tag that is powered by a power source. In some embodiments, the electrical separation may be triggered by a power level of the power source. In some embodiments, the electrical separation may be accomplished by a switching operation of a metal-oxide semiconductor field effect transistor (MOSFET). In some embodiments, the two mating portions include mating portions of a snap connector. In some embodiments, the attachment mechanism may further include at least one adhesive layer. In some embodiments, the attachment mechanism may be configured to allow the RFID device to be moved from the second configuration to the first configuration and resist the RFID device from being moved from the first configuration to the second configuration.

In another aspect an activation mechanism for a device includes a first electrical contact disposed on a first portion of the activation mechanism and a second electrical contact disposed on a second portion of the activation mechanism, wherein the first and second portions of the activation mechanism are configured to be moved relative to one another such that in a first configuration of the activation mechanism, circuitry of the device is electrically closed through the first and second electrical contacts, and in a second configuration of the activation mechanism, a connection between the first and second electrical contacts is electrically opened. The activation mechanism is configured to allow relative movement of the first and second portions from the second configuration to the first configuration and resist relative movement of the first and second portions from the first configuration to the second configuration.

In some embodiments, the device may be a radio frequency identification (RFID) device. In some embodiments, the circuitry may include a power source that is configured to provide operating power to at least one of: (i) a portion of the circuitry and (ii) an antenna of the RFID device. In some embodiments, the circuitry may further include a switch powered by the power source, the switch disposed such that a depletion of the power source causes the switch to disconnect a first portion of the circuitry from a second portion of the circuitry. In some embodiments, the display is configured to present an output of a timer. In some embodiments, the activation mechanism may further include a snap connector, wherein the first electrical contact and the second electrical contact are disposed on corresponding portions of the snap connector configured to attach to one another in a mating configuration.

In one embodiment, a device includes an electrical load, a first electrical trace in electrical communication with the electrical load, and a second electrical trace in electrical communication with the electrical load. The device also includes a connector that attaches the device to an object. When the connector is in an unconnected state the first electrical trace and the second electrical trace are not in electrical communication and the electrical load is inactive. When the connector is in a connected state the first electrical trace and the second electrical trace are in electrical communication and the electrical load is activated.

In another embodiment, a method includes attaching a device including an electrical load to an object. Attaching the device to the object places a first electrical trace of the device in electrical communication with a second electrical trace of the device to activate the electrical load.

In yet another embodiment a device includes an electrical load, a first electrical trace in electrical communication with the electrical load, a first electrical contact in electrical communication with the first electrical trace, a second electrical trace in electrical communication with the electrical load, and a second electrical contact in electrical communication with the second electrical trace. The device also includes a first connection feature and a second connection feature. Further, connecting the first connection feature to the second connection feature places the first electrical contact in electrical communication with the second electrical contact.

In another embodiment, a method includes: connecting a first connection feature of a device to a second connection feature of the device; and placing a first electrical contact in electrical communication with a second electrical contact as the first connection feature is connected to the second connection feature. Further, the first electrical contact is in electrical communication with a first electrical trace of an electrical load, and the second electrical contact is in electrical communication with a second electrical trace of the electrical load.

In yet another embodiment, an activation mechanism includes a first electrical contact and a second electrical contact. The first electrical contact and the second electrical contact are initially distanced from one another, and the first electrical contact is displaceable towards the second electrical contact. Additionally, displacing the first electrical contact towards the second electrical contact places the first electrical contact and the second electrical contact in electrical communication with one another. The device also includes at least one adhesive layer associated with the first electrical contact and/or the second electrical contact such that the at least one adhesive layer holds the first electrical contact in the displaced configuration.

In another embodiment, a method for activating a device includes: displacing a first electrical contact towards a second electrical contact from a first operating state where the first electrical contact is distanced from the second electrical contact to a second operating state where the first electrical contact and the second electrical contact are in electrical communication; and holding the first electrical contact and the second electrical contact in the second operating state with at least one adhesive layer.

In yet another embodiment, an activatable radio frequency identification device includes an antenna coil, a circuit, a first electrical contact, and a second electrical contact. In a first operating state the first electrical contact and the second electrical contact are unconnected and the antenna coil and/or circuit are disabled. However, in a second operating state the first electrical contact and the second electrical contact are in electrical communication and the antenna coil and circuit are enabled.

In another embodiment, a method of activating a radio frequency identification device includes: attaching a disabled radio frequency identification device to an object. Further, attaching the radio frequency identification device enables the radio frequency identification device.

Various implementations described herein may provide one or more of the following advantages. By providing identification devices (e.g., radio frequency identification (RFID) tags or near-field communication (NFC) modules) that are not activated until attached in a specific configuration to a corresponding object or user, the identification devices can be kept unobservable or "hidden" from reading devices such as scanners. The identification devices may therefore be kept unobservable to corresponding reader devices until actual use without using special packages (e.g., shielded boxes). Because inactive identification devices are not observable, differentiation between active and inactive identification devices can be easily made. In some cases, this may obviate the need for sophisticated differentiation mechanisms that require recording state changes of devices, updating databases, and/or specialized scanners or readers capable of tagging devices as active. In some cases, where the identification devices are powered by internal power sources, the technology described herein may be used to improve battery life by preventing or reducing battery drainage until actual use. In some cases, by providing a switch (e.g., a transistor such as a MOSFET) between the power source and a circuit, an identification device may be automatically disabled upon depletion of the power source. In some cases, this may improve post-use privacy and/or security of an identification device by making the device unobservable to readers and scanners once the use for the device has ended. In some cases, this may reduce the cost of the identification devices, for example, by obviating the need for backup power sources such as capacitors or secondary batteries, and/or additional circuitry (e.g., battery indicator or voltage detector) for anticipating the depletion of the power source and taking any actions accordingly.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 11A is a cross-sectional view of an activation mechanism including a deformable electrical contact that is initially spaced from a corresponding electrical contact with an adhesive layer disposed between the two electrical contacts;

FIG. 11B is a cross-sectional view of the activation mechanism of FIG. 11A after the deformable electrical contact has been placed in electrical communication with the corresponding electrical contact and is held in place by the corresponding adhesive layer;

FIG. 12A is a schematic representation of a radio frequency identification device with electrical contacts located between the antenna coil and circuit in the open state to disable the radio frequency identification device;

FIG. 12B is a schematic representation of the radio frequency identification device of FIG. 12A with the electrical contacts in the closed state to enable the radio frequency identification device;

FIG. 13A is a schematic representation of a radio frequency identification device with electrical contacts located within a portion of the associated circuit in the open state to disable the radio frequency identification device;

FIG. 13B is a schematic representation of the radio frequency identification device of FIG. 13A with the electrical contacts in the closed state to enable the radio frequency identification device; and FIG. 14 is a schematic representation of an activatable radio frequency identification device being read by an area reader and information being transmitted to a remotely located database.

DETAILED DESCRIPTION

Figure 1:
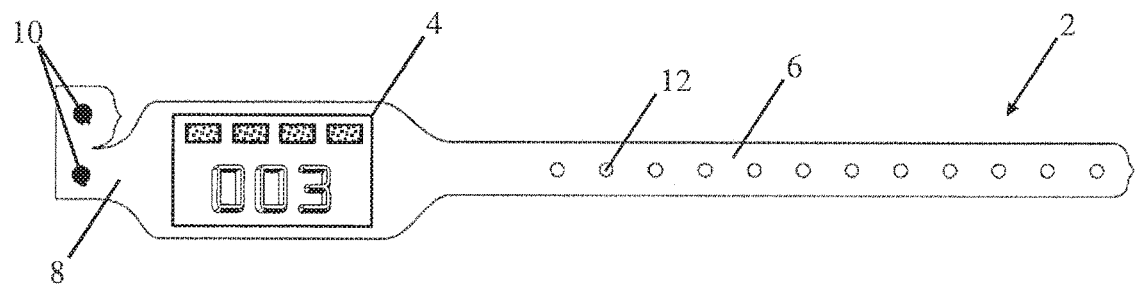
FIG. 1 depicts one embodiment of a wristband including a timer display that is automatically activated by an associated connector.

Remote identification systems that use, for example, radio frequency identification (RFID) or near-field communications (NFC) are widely used in various applications including healthcare applications. In healthcare settings, timely activation and/or deactivation of identification devices such as RFID tags can be important from various perspectives, including, for example, efficiency, accuracy, privacy, and security. For example, if an identification device includes an RFID tag, it may be desirable to prevent RFID readers from communicating with or reading information from the RFID tag until the tag is actually in use (e.g., put on a patient). Otherwise, the tag may be read, for example, while being transported prior to actually being used, which in turn may import redundant or unusable information into databases thereby leading to inefficiencies. In some cases, this may be prevented, for example, by transporting yet unused RFID tags in specially shielded packages that prevent RFID readers from reading the tags within. However, such packages can add to the overall implementation costs, and yet leave the tags vulnerable to being read or discovered once taken out of the packages. Also, because both active as well as inactive tags are potentially discoverable or readable by a reader, specialized marking of active RFID tags may be needed (e.g., using embedded processing devices in the tags or using a database to keep track of state changes) to differentiate between active and inactive tags.

This document describes identification devices such as RFID tags that are produced and shipped in a first configuration, in which a circuit within a device is open, thereby making the device or tag undiscoverable to any corresponding reader. The identification device is further configured with electrical contact points that come in contact with one another in a second configuration, thereby closing the circuit, and activating the device. The electrical contact points may be disposed such that an identification device moves into the second configuration when it is put to use. For example, if an RFID tag is disposed in a wristband, the electrical contact points may be disposed such that simply putting the wristband on a patient creates an electrical communication between the electrical contact points and activates the tag. Such automatic activation may not only obviate the need for any secondary action to activate the tag (thereby reducing possibility of human errors), but also ensure that the tags are activated as soon as they are put to use, thereby potentially allowing for accurate logging of a time point. In addition, because inactive tags are not discoverable, the problem of distinguishing between active and inactive tags may potentially be obviated. For powered identification devices (e.g., RFID tags that include a power source), keeping the circuit open until actual use can reduce drainage of the power source and potentially increase shelf life of the devices. While the description below describes the technology primarily using examples of RFID identification devices, other types of devices such as a time tracking device, a display device, or a communication device may also be activated and/or deactivated using technology described herein.

In some cases, deactivation of identification devices may also be important. For example, in a RFID device that uses a power source, depletion of the power source may render the device useless for continued use. However, if the device also includes a passive RFID tag, potentially sensitive data may still be retrievable from the device upon query by a RFID reader. In some healthcare applications, this may create security and privacy concerns. The technology described herein also provides for a switch (e.g., a metal-oxide semiconductor field effect transistor (MOSFET)) disposed between a power source and the rest of the RFID circuit, such that depletion of the power source opens the switch and makes the RFID circuit unusable as a passive device. In some cases, this may increase post-use security of such identification devices without having to use additional circuit elements such as battery indicators and/or low voltage detectors that track the life of a power source and take additional actions (e.g., deleting data) accordingly.

In some instances, the activated or enabled device may be enabled using a permanent connection. However, embodiments in which a reusable or otherwise non-permanent connection may be used are also contemplated. In instances where a permanent connection is used, the permanent connection may ensure that the activated device cannot be reset or altered without leaving a visible indication which may help to provide a highly reliable component in high-risk situations or situations requiring accurate documentation as mentioned above, though it should be understood that such a device may be applied in other applications as well.

In some instances, it may be desirable to integrate the activation of a device and/or device function with other functional steps performed with, or on, the device. For example, in one embodiment, a device and/or device function may be activated when a functional step associated with the use of the device is performed. Thus, the activation of the device and/or function may be thought to piggyback on the functional step already performed on or by the device. In one such embodiment, a functional step might include attaching a device to an object or portion of a subject as might occur when attaching a band to a patient (e.g. by a closing a snap, pressing closed an adhesive portion, etc.). The act of attaching the band may then either activate the band and/or activate a specific function of the band as described in more detail below. Further, since attaching the band is already part of the workflow process in many situations, including hospital admissions of a patient, activating the device and/or device function may be thought of as fitting in with a standard workflow without requiring a separate new step to activate the device and/or device function. As such, activating the device may not take additional time to complete over and above the time taken to complete the functional step through which the activation is accomplished (e.g. closing a snap on a wristband both attaches the device to the subject and activates the device function). For example, in some embodiments, the activation may be accomplished in less than two seconds. In some embodiments, the activation may be accomplished without the use of external equipment (e.g. the user needs only use his or her hands to accomplish the activation). As such, the technology described herein may be used to create substantially permanent connections quickly, for example, in the process of carrying out another task, to provide secure and potentially tamper-proof connections. It should be understood that while activating a band during attachment has been described, other applications with different devices might also be used as the disclosure is not so limited. Further, depending on the embodiment, the activation of the associated device and/or device function may be a permanent activation though embodiments in which the device and/or device function are selectively activatable and deactivatable are also contemplated.

In one embodiment, a device may include first and second electrical traces associated with an electrical load that are placed into electrical communication with one another when an associated connector is placed into the connected state to attach the device to an object. Once the electrical traces are placed into electrical communication with one another the electrical load is enabled. For example, a device may include first and second electrical contacts associated with the traces noted above. These electrical contacts may be associated with the corresponding connection features of the device such that when the connection features are mated with one another, the electrical contacts, and the corresponding electrical traces, are placed into electrical communication. Of course it should be understood that the electrical traces and electrical contacts may be arranged in any appropriate fashion that is capable of disabling one or more functionalities of a device when in the open state. However, in some embodiments, it may be desirable to reduce the power consumption of a device. In such an embodiment, the electrical contacts and traces may be arranged such that the electrical load and an associated power source are not in electrical communication with one another in the disabled state. Thus, when the electrical contacts and/or traces are placed in electrical communication with one another, the electrical load and power source are connected thus powering the electrical load and enabling the device. In addition to the above, in some embodiments, it may be desirable to permanently enable the electrical load. In one such embodiment, the associated connector may be a permanent connector, and thus, the electrical load may be permanently enabled.

The inventors have also recognized the benefits associated with permanent activation mechanisms that once activated cannot be disabled (e.g. the device cannot be turned off, for example, without breaking the device, or at least leaving detectable evidence of tamper). For example, in one embodiment, an activation mechanism includes first and second electrical contacts that are initially separated from one another in a first operating state or configuration. During actuation of the mechanism, at least the first electrical contact is displaced towards the second electrical contact until the electrical contacts are placed in electrical communication with one another. As the first electrical contact is displaced, one or more adhesive layers are engaged, either directly or indirectly, by the first electrical contact and/or the second electrical contact. Thus, once fully actuated, the adhesive layers maintain the first electrical contact in its displaced configuration in a permanent second operating state where the electrical contacts are in electrical communication with one another. In some implementations, the activation or attachment mechanisms of the identification devices described herein can be configured such that they allow the devices to be moved from a second non-activated configuration to a first activated configuration, yet resist a change from the activated configuration to a non-activated configuration. For example, in order to deactivate the above-mentioned example of the adhesive layer device from its activated state, the circuitry would have to be cut or otherwise broken, the adhesive layers would have to be irreversibly separated, or both. In another example, the attachment or activation mechanisms can include fasteners or connectors (e.g., snap connectors) that facilitate being moved from an open or unlocked configuration to a closed or locked configuration (which also activates the corresponding device), yet provide significant resistance to being unlocked or moved back to the open configuration. In some cases, the resistance can practically prevent the device from being moved from the activated configuration to the inactivated configuration without causing at least tamper-evident damage to the device.

An adhesive layer used in the permanent activation mechanisms described above may be located in any appropriate position such that it maintains the electrical contacts of a permanent activation mechanism in electrical communication with one another after actuation. For example, in one embodiment, an adhesive layer may be a conductive adhesive layer and be disposed between the electrical contacts such that the electrical contacts are in electrical communication with one another through the adhesive layer. However, in other embodiments, the one or more adhesive layers may be adjacent to, or otherwise associated with, the electrical contacts such that the adhesive layer is engaged and hold the electrical contacts in place. Further, it should be understood that the electrical communication between the electrical contacts may either be direct electrical communication, or it may be indirect electrical communication (i.e. between an intermediate electrically conductive material), as the disclosure is not so limited.

The inventors have also recognized that in some applications it may be desirable to facilitate the identification and tracking of processes, objects, and/or subjects such as animals or people. Consequently, the inventors have recognized the benefits associated with a communication device, such as a radio frequency identification (RFID) device, near field communication device (NFC), a Bluetooth® device, a wireless communication chip, and/or other appropriate communication devices, that transitions from a first inactive state to a second active state. Further, in some embodiments, the communication device may be activated once it is attached to an object such as a portion of a subject and/or a container. In some embodiments, the communication device includes first and second electrical contacts that are transitioned from an open state to a closed state through any appropriate method to either connect power to the communication device and/or enable one or more portions of the communication device such as a communication circuit or processor. In one such embodiment, the communication device is a radio frequency identification device including first and second electrical contacts which are initially in an open unconnected state may selectively disable electrical communication either between an antenna coil and a circuit of the radio frequency identification device and/or the electrical contacts may be arranged to disable the circuit. Correspondingly, once the electrical contacts are brought into electrical communication with one another, the radio frequency identification device may be enabled by either connecting the antenna coil with the circuit and/or completing a connection within the circuit itself to enable the radio frequency identification device.

It should be understood that a device activated through the use of a connection, the permanent activation mechanisms, and the activatable communication devices, such as RFID devices, described herein may be used in any appropriate combination together. For example, in one embodiment, in addition to activating an electrical load, connecting the connector of a device may also activate an associated radio frequency identification device, or other appropriate communication device, at the same time. While any number of arrangements may be used to implement such a device, in one embodiment, one or more portions of a connector may form a ground connection that the various circuits are attached to. Therefore, once the connector is connected, the ground is placed into the circuit and the electrical load and RFID device, or other communication device, are activated at the same time. Of course embodiments in which the communication device and the electrical load are activated separately are also contemplated. Correspondingly, an activatable communication device may be combined with a permanent activation mechanism such that a user may permanently activate the communication device when it is desired including, for example, when the communication device is attached to, or integrated with, an object during manufacturing or tagging.

It should be understood that the various embodiments incorporating connectors described herein may include any appropriate type of connector as the disclosure is not limited in this manner. For example, in some embodiments, a connector may be a reusable connector such that a device, and associated electrical load or RFID device, may be selectively activated or deactivated by connecting and disconnecting the connector. Alternatively, in some applications, it may be desirable to provide a system that cannot be turned off without purposefully breaking, or otherwise altering, the device. In such an embodiment, the associated connector may be a permanent connector that is used to form a permanent electrical contact that permits the device to function continuously so long as it has power. To further facilitate such an embodiment, it may be desirable to ensure that the device is robust against tampering and/or unintentional damage. In view of the above, appropriate types of connectors may include snap connections, adhesives, conductive adhesives, mechanically interlocking features, interference fits, threaded components, or any other appropriate feature capable of providing both a physical connection and placing associated electrical contacts and/or traces in electrical communication with one another.

In some instances, it may be desirable to provide user feedback that indicates a device has been connected and/or activated. In such an embodiment, the connector may provide an audible, tactile, and/or visual feedback to the user. For example, in one embodiment, a connector may provide an audible snap to confirm that it has been connected. In another embodiment, a visual indicator such as exposed colorations and/or textures indicate that the connector is not closed and/or that the load is not functioning properly. Once the connector is in the closed state the visual and/or tactile indicator is no longer observable by a user indicating that the connector is in the connected or closed state and/or that the load is functioning properly. In one such embodiment, a first portion of the connector may have a first coloration and a second portion of the connector that covers the first portion of the connector in the connected state may have a second coloration such that when connected a user only sees the second portion of the connector with the second coloration.

While in some embodiments, a connector may be used to simply bring two or more electrical contacts and/or traces proximate to one another, in other embodiments, the connector itself may function as one or more electrical contacts. In such an embodiment, it is desirable for at least a portion of the connector to be electrically conductive. Further, it should be understood that the connectors may be made from any number of different materials. For example, in one embodiment, a connector may be made out of a non-conductive plastic or other appropriate material. In such an embodiment, the connector may be coated in one or more locations with a conductive material such as a metal coating. This conductive coating may be applied in any appropriate manner including lamination, electroless plating, electrodeposition, vapor deposition, conductive paints or inks, and/or using any other appropriate method or material. Further, the coating may be applied either to a portion of the connector or the entire connector. In another embodiment, the connector may be made from a conductive material such as a conductive polymer, a metal, a conductive composite (e.g. a polymer mixed with carbon black), or any other appropriate conductive material that is appropriate for making a connector out of. In still yet another embodiment, a composite structure may be formed to provide the desired conductive connector. For instance, a connector may include a conductive core and a plastic overmold positioned on the core to form the remaining portion of a connector.

In embodiments where a mechanical interface is used to hold electrical contacts and/or traces in electrical communication, it may be desirable to provide sufficiently tight tolerances on the parts to avoid movement of the connector that might result in a broken or intermittent connection between the contacts and/or traces. Such a fit may be provided in any number of ways including, sufficiently tight tolerances, biasing the different portions of a connector together, providing an interference fit between connected components, using compliant electrically conductive materials between different portions of a connector, and other appropriate configurations as the disclosure is not limited in this fashion.

As noted above in some instances, a connector functioning as an electrical connector may result in intermittent lack of power to a device. Therefore, in some embodiments, it may be desirable to configure the device such that it still operates even if power is not applied to the device for a given amount of time. For example, in one embodiment, a device may continue operating from the point where power was disconnected if the power has been disconnected for less than or equal to about 0.1 seconds, 1 second, 2 seconds, 3 seconds, 4 seconds, 5 seconds, and/or any other appropriate time as the disclosure is not so limited. Additionally, in some related embodiments, the device is a timer, and the device may indicate if the recorded time data is valid or not based on a measured amount of time that power was not applied to the device during operation. For instance, in one embodiment, the timer may indicate that the time data is valid if the measured amount of time that power was disconnected is less than or equal to 1 second, 2 seconds, 4 seconds, 30 seconds, 1 minute, 30 minutes, or any other appropriate time period suitable for a given application.

While mechanically based connectors are primarily described above, in some embodiments, a non-mechanical based connector may be used. For example, in one embodiment a connector may correspond to an adhesive layer and/or magnetic materials (e.g. permanent magnets and magnetically susceptible material such as iron). In one such embodiment, an adhesive or magnetic material may simply be positioned so as to hold two or more electrical contacts or traces proximate to one another. In other embodiments, a conductive adhesive is positioned so that it is located between, or bridges, two or more electrical contacts or traces when the device is in the connected state. Appropriate conductive adhesives include, but are not limited to, conductive polymer based adhesives as well as epoxies, silicone pressure sensitive adhesives, and other non-conductive polymer based adhesives embedded with conductive filler particles such as silver, palladium, nickel, and other conductive materials.

When making a device with a connector for a particular use, it may be desirable to take user ergonomics into consideration. User ergonomics may correspond to a number of different parameters based on the application. One such consideration is the required strength to initiate an action (e.g. close a snap connector). Another consideration might be integrating the device operation with other actions taken during the typical course of an application. For example, in a clinical setting, it may be desirable to integrate the activation of a device with other clinical activities that are normally done during the treatment of a subject such as connecting a wristband to the subject. By integrating the functionality of a device with other steps already conducted during a procedure, the likelihood of completing a task under time pressures and in a number of different situations may be increased.

The devices described herein may be attached to any number of different objects based on the particular application, and may be attached in any number of different ways. For instance, appropriate objects include, but are not limited to: portions of a subject's body; rigid and/or flexible containers; an exterior surface of a product or device; or any other appropriate object that a user might wish to attach an activatable device to. Appropriate portions of a subject's body may include a neck, wrist, ankle, leg, arm, toe, finger, or other appropriate portion of the body. In some applications, a container might correspond to a container including a pharmaceutical product or drug (e.g. a medicine container or IV bag).

In addition to the above, a device may be attached to an object either directly or indirectly. For example, a device may include a first portion of a connector that mates with a second portion of a connector located on the object. Alternatively, a first connecting feature on a device may connect to a second connecting feature on the device to attach the device to the object. One such embodiment may include two halves of a snap connector attaching the connection features together so that the device encircles a portion of the object. In a similar embodiment, holes formed in a strap or other structure are captured in another connector such a snap connector including a shaft that passes through the holes to connect the ends of the strap together such that they encircle a portion of the object in the connected state.

An electrical load associated with an activatable device may correspond to any number of different applications as the disclosure is not limited to the specific applications described herein. However, several exemplary electrical loads include, but are not limited to, a display (e.g. an LCD display, electrochromic display, electrophoretic display, LED display, etc.), a timing circuit, a speaker, a GPS or other position tracking circuit, an RFID device, one time use devices, communication circuits, combinations of the above, and/or any other appropriate electrical load for a desired application.

The presently disclosed devices may have any appropriate form factor based on the desired application. For example, in some embodiments, a device may be a rigid structure while in other applications the device may be flexible. Additionally, a device may either have a thin or thick profile as the disclosure is not so limited. In instances where flexibility and/or a thin profile are desired components such as flexible circuits, printed batteries, thin and flexible displays, thin film displays, combinations of the above, or other appropriate components may be used. In view of the above, several possible device forms include straps, patches, collars, wristbands, ankle bands, as well as other appropriate forms based on the desired application.

The devices and activation mechanisms described herein may be applied to a number of different applications. For example, in one embodiment, a medical device may automatically capture or otherwise record medical events. A device may also be irreversibly activated such as in the case of irreversibly initiating a therapy or monitoring of a subject with a permanently activated device. In another embodiment, an activatable worn device may be used for auditing event-related information, e.g. time cuffs worn for a race, identification tags attached to evidence at a crime scene, and/or other events. The described devices may also be used by secure transaction service providers (e.g. secure communications/transactions, organ transport, etc.) where timing and/or the occurrence of events need to be verified. In yet another application the described devices may be used for real-time location tracking and/or reporting for devices, products, persons, animals, asset movement, robot guidance, and other location specific applications. For example, during the repair of a robot, an operator may identify a problem and physically tag the robot with a permanent event tracker, leading to algorithmic prioritization for repair servicing based on time, location, and/or other considerations. The described devices might also be applied to the permanent activation of disposable electronics such as electronic birthday cards, one-time-use diagnostic tools, and other appropriate uses.

In view of the above, in one embodiment related to the treatment of stroke and other emergency cases, subjects need to be registered or have information about them put into a care giver's system. In such an application, as part of the subject intake process a one-time-use band, or other structure, is attached to the subject on their wrist or another appropriate portion of their body. The system may then start timing and/or monitoring of the situation once the device is attached to the subject.

Many disposable medical devices have strict amounts of time that the device is permitted to remain on a subject. Therefore, in another embodiment, a device is designed so that when a caregiver opens the packaging, or otherwise activates a device, a mechanical interrupt is removed from between two electrical contacts. In one embodiment, a pull tab is removed from between two electrical contacts attached to an electronic system, or a connection is completed when a timing device is attached to the medical device, thus completing the circuit. The pull tab and/or connection cannot be replaced, nor the two electrical contracts opened without breaking apart the device. Therefore, the medical device itself, and/or a separate timing device permanently attached to the medical device, may function as a permanent timer indicating when the medical device needs to be removed.

Multiple drugs and/or biologics are often times delivered in a specific sequence and at specific times to a subject during the course of a therapy. Consequently, in yet another embodiment, a subject's wristband, or other device attachable to a portion of the subject's body, may be used to confirm delivery and timing of the various therapies. For example, multiple timing stickers or other connectible devices may be snapped onto the subject's wristband, or user inputs, such as buttons provided on the device, may be used to capture information related to the therapies, in order to confirm the time post-initiation of the device and/or the completion of delivery for each drug.

In some embodiments, a subject's wristband, or other device attachable to a portion of the subject's body, may be used to track the subject's spatial location within a hospital or treatment center. In some embodiments, an activatable radio frequency identification device may be affixed to equipment or staff to track spatial location or event timing.

In some embodiments, the activatable radio frequency identification devices described herein may include a deactivation mechanism. For example, at the end of the life of an activatable radio frequency identification device that is powered by a power source, the power source may become depleted. Upon depletion of the power source, a switch such as a MOSFET included in the circuitry of the device may open, thereby causing the circuit to become open. For example, the MOSFET may be disposed between the power source and the circuit in a way that the power source provides the gate voltage for the MOSFET. In such cases, when the power source is depleted, the connection through the MOSFET is severed, and the corresponding circuit is opened. This in turn can cause an antenna, or other portions of a circuit to become deactivated and/or undetectable by a scanning device. Additionally, in some cases, a display element may also become deactivated, such that no identification information remains on the display element upon depletion of the power source.

Turning now to the figures, several non-limiting embodiments are described in more detail. While specific embodiments are described below, it should be understood that the disclosure is not limited to only the embodiments described in relation to the figures. Instead, the various features, components, combinations, and methods described below may be used separately or in any appropriate combination as the disclosure is not so limited.

FIG. 1 depicts one embodiment of an activatable device in the form of a wristband 2. The device includes an electrical load 4 in the form of a display. In this particular embodiment, the display is used for indicating a time since the device has been activated. However, embodiments in which other information is displayed and/or a different type of electrical load is associated with the activatable device are also contemplated. The device includes a first portion and second portion corresponding to first and second straps 6 and 8 that attach the device to a portion of the subject's body when they are positioned proximate to one another. In the depicted embodiment the one or more straps 6, 8 extend outwards from the portion of the device including the electrical load. The straps 6 and 8, or other appropriate portions of the device, include corresponding first and second connection features disposed thereon. In this particular embodiment, the connection features correspond to a snap connector 10 that engages with and captures one or more holes 12 formed in the corresponding strap 6. Depending on the embodiment, the connection features may form a permanent connection using any appropriate configuration including, for example, a permanent snap connector, though embodiments in which a non-permanent connector is use are also contemplated. Once the connection features are connected to one another the device encircles a portion of the subject's body (e.g. a wrist, ankle, etc.) to attach the device thereto. However, as previously noted, other arrangements of connection features on different portions of the device, on a device with a different form factor, and/or connections that mate directly to an object are also contemplated as the disclosure is not so limited.

Figure 2:
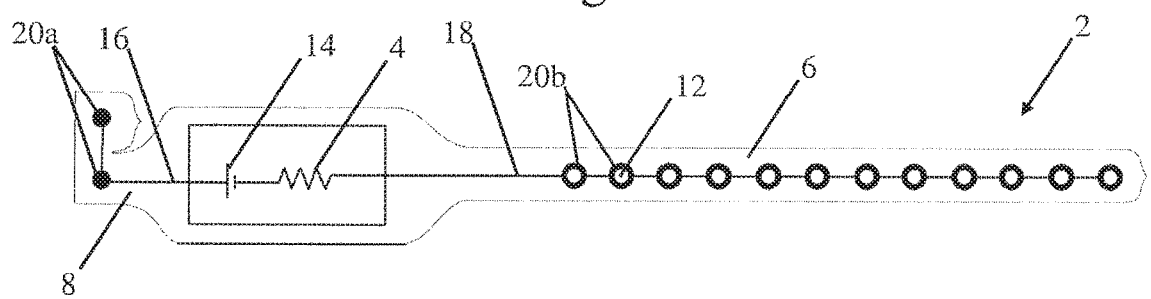
FIG. 2 depicts an embodiment of an electrical layout for an automatically activated wristband including electrical contacts on a connector and associated holes of the wristband.

FIGS. 2-7 depict various arrangements of electrical contacts and traces relative to the portions and features of an activatable device such as the one shown in FIG. 1. FIG. 2 illustrates the arrangement of an activatable device that selectively place an electrical load 4 in electrical communication with a power source 14. The illustrated device also includes first and second electrical traces 16 and 18 associated with the power source 14 and electrical load 4. The first electrical trace 16 is in electrical communication with at least one portion of a conductive connecting feature such as an electrically conductive snap connector that functions as a first electrical contact 20a. In the depicted embodiment, the second electrical trace 18 is in electrical communication with one, or a plurality, of second electrical contacts 20b which are associated with the plurality of holes 12 (e.g. disposed around the holes) extending along a length of the strap 6 as depicted in the figure. During operation, the first and second straps 6 and 8 are brought together and the snap connector is positioned such that a portion of the connector passes through an associated hole to connect the different portions of the wristband together and attach it to a subject. Due to the snap being electrically conductive, when the snap connector 20a is brought into contact with one or more of the second electrical contacts 20b surrounding the holes, the first and second electrical contacts, and the associated first and second electrical traces 16 and 18, are placed into electrical communication with one another. Consequently, the power circuit connecting the power supply 14 and the electrical load 4 is completed enabling the device. Again, in some embodiments, the snap connector, or other appropriate connection feature, may provide a permanent connection in order to permanently enable the electrical load 4.

The above noted embodiment may enable a user to determine the exact timing conditions when the device was taken off or otherwise deactivated, i.e. the electrical connection was severed. Thus, the device may stop when it is removed which may be preferable in certain situations. However, such a device may also be susceptible to inadvertent disconnection due to the multiple points of potential failure associated with the multiple electrical contacts located along a length of the strap. Consequently, in some embodiments, the device may include redundant electrical traces and/or reinforcements such as thicker components, plastic laminates, backing materials, increased trace thicknesses, and other appropriate features. Additionally, or alternatively, materials and tolerances of the electrical traces, electrical connectors, and/or device body may be selected to increase the mechanical precision of the closure of the first and second electrical connectors. In some implementations, this may reduce the chances of the connectors moving in relation to one another, which may sever the electrical connection and inadvertently deactivate the device.

In some embodiments, the example device shown in FIG. 2 may be removed from the wrist of a patient by cutting through a portion of the device. This causes the circuit in the device to be broken, thereby making the device suitable for one-time use applications. Further, the breaking of the circuit upon removal can make the device useful, for example, in situations where it is desirable to deactivate a device immediately upon removal from a patient. However, operations such as data read-out, or recycling of portions of the device may not be possible.

Figure 3:
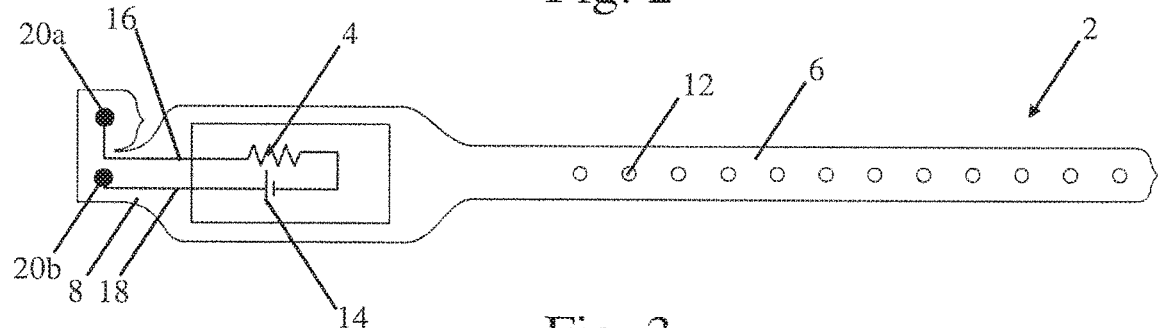
FIG. 3 depicts an embodiment of an electrical layout for an automatically activated wristband including separate electrical contacts on matable portions of a connector.

Another possible embodiment is depicted in FIG. 3 which depicts an activatable device including an electrical load 4 and power source 14 associated with first and second electrical traces 16 and 18. As illustrated in the figure, the electrical traces are located within a single portion of the device for example, in the depicted embodiment, the electrical traces are positioned in a portion of the wristband including the snap connector. The electrical traces 16 and 18 are in electrical communication with separate electrical contacts 20a and 20b corresponding to separate matable connection features such as the separate portions of an electrically conductive snap connector. Alternatively, the electrical contacts may be associated with an adhesive material applied on or adjacent to the contacts. In instances where the adhesive material is positioned between the electrical contacts, the adhesive material may be an electrically conductive adhesive. The term "matable" as used in this document, refers to separate portions that can attach to one another in a mating configuration, for example to create an electrical communication path between the portions.

Several of possible benefits associated with the embodiment depicted in FIG. 3 include minimizing the area where an electrical connection for an activatable device may be accidentally severed. Additionally, the device may remain activated even when it is removed from the associated object and/or subject that it is attached. For example, a wristband might include instructions to cut the device where it does not include electrical traces and/or reinforcements along the portions including the electrical traces to help prevent possible disconnection of the electrical traces. In some cases, if the device is appropriately removed from a patient (e.g., by cutting at portions where circuit elements are not present), additional post-removal operations such as data-readout can be made possible. In some implementations, because the circuit is not physically broken, portions of the circuit may also be reusable or recyclable in another similar device. Further, in embodiments where it is desirable to permanently activate the device, the connector forming the different connection features may be a permanent connector as described previously. Though embodiments in which the connector is reusable, i.e. openable and closable, are also contemplated as noted previously.

Figure 4:
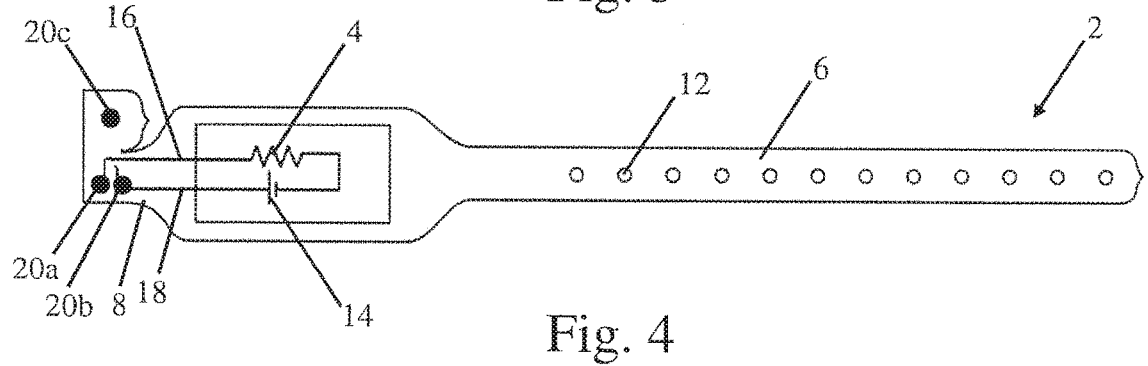
FIG. 4 depicts an embodiment of an electrical layout for an automatically activated wristband including bridging electrical contacts on a connector.

FIG. 4 illustrates an embodiment of an activatable device which includes an electrical load 4 and associated power source 14. The first and second electrical traces 16 and 18 are in electrical communication with first and second electrical contacts 20b and 20c which are positioned adjacent to one another on a first portion of the device. A third electrical contact 20a is positioned on a separate portion of the device, which in the depicted embodiment is a foldable tab connected to the portion of the strap including the first and second electrical contacts. When the tab is folded, the associated connection features and electrical contacts are brought proximate to one another. Thus, engaging the connection features with one another places the device into a connected state attaching it to an object, and positions the third electrical contact so that it bridges the first and second electrical contacts. Consequently, the third electrical contact may be considered a bridging electrical contact that is brought into electrical communication with the first and second electrical contacts to complete the circuit between the power supply and the electrical load to enable the device. The above embodiment may offer the benefit that it does not require the electrical traces and/or other conductors to be bent during actuation of the device which may improve device reliability.

Figure 5:
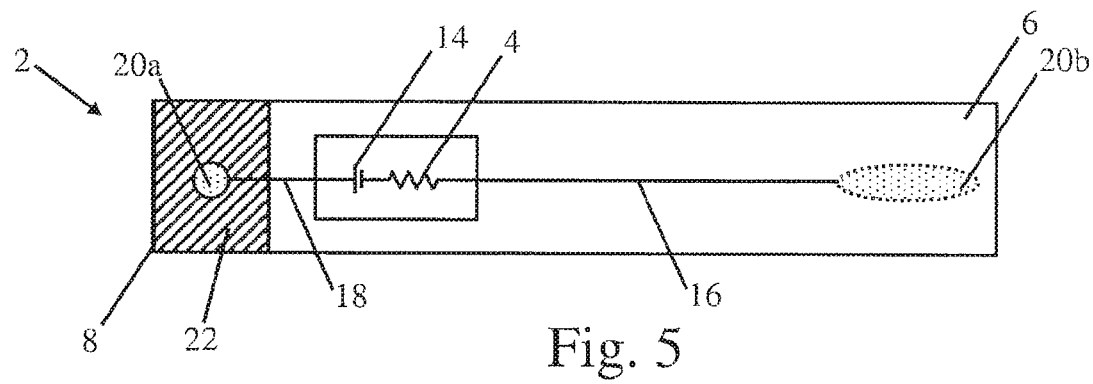
FIG. 5 depicts an embodiment of an electrical layout for an automatically activated wristband that is attached using an adhesive.
Figure 6:
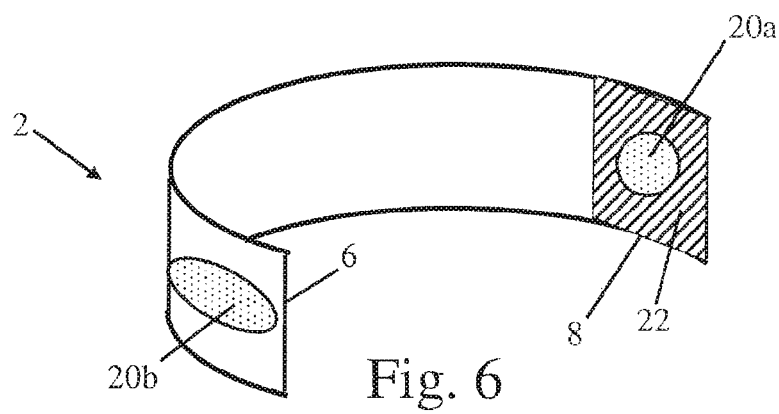
FIG. 6 depicts a perspective view of the wristband of FIG. 5.

FIGS. 5 and 6 illustrate an embodiment of an activatable device in the form of a wristband that specifically includes one or more adhesive layers for attaching the device to an associated object. In the depicted embodiment, an electrical load 4 and power source 14 are connected to first and second electrical traces 16 and 18 as described previously. Similarly, the first and second electrical traces 16 and 18 are in electrical communication with first and second electrical contacts 20a and 20b, respectively. The device also includes at least one adhesive layer 22 positioned on one end of a strap forming the wristband. In such an arrangement, the adhesive layers 22 and/or corresponding surfaces of the device it is adhered to in the connected state may be considered the connection features of the device. However, multiple regions of adhesive and/or different locations other than an end of a strap are contemplated as the disclosure is not limited to any particular location and/or arrangement of the at least one adhesive layer.

In some embodiments, it may be desirable for the first and/or second electrical contacts to be elongated to facilitate electrical contact between them even when the ends are positioned differently relative to one another to accommodate different size objects such as people with different sized wrists. Such an embodiment is shown in FIG. 5. In an alternative embodiment, the electrical traces are arranged such that their paths cross each other when the different portions of the wristband are brought proximate one another.

Figure 7:
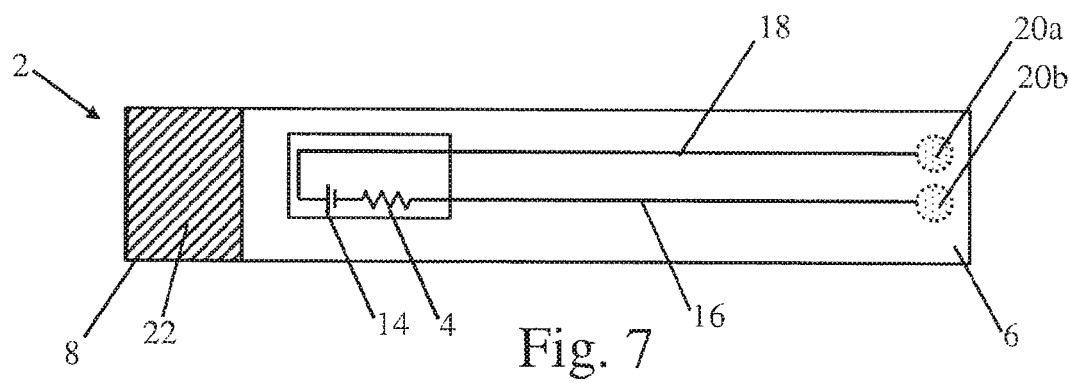
FIG. 7 depicts an embodiment of an electrical layout for an automatically activated wristband that is attached using an adhesive.

Depending on the embodiment, the electrical contacts and/or traces of an activatable device are brought into direct contact with one another to provide electrical communication between the electrical traces. In such an embodiment, an associated adhesive layer may be applied adjacent to, but not covering, the electrical contacts and/or traces. In another embodiment, the adhesive may be an electrically conductive adhesive and is positioned so that it covers the associated electrical contact and/or electrical trace and is located between the electrical contacts and/or traces when the device is in the connected state. Therefore, electrical communication between the electrical contacts and/or traces in such an arrangement is through the electrically conductive adhesive. While the electrical contacts may be located on different portions of the device 2 as depicted in FIGS. 5 and 6, in another embodiment as shown in FIG. 7, the electrical contacts 20a and 20b may be disposed adjacent to one another on a first portion of the device 2. A corresponding electrically conductive adhesive layer 22 is then disposed on a portion of the device that is brought proximate to the electrical contacts in the connected state. When the adhesive layer 22 is engaged with the other portion of the device including the electrical contacts, the electrically conductive adhesive layer 22 acts as a bridging contact between the first and second electrical contacts 20a and 20b completing the circuit and enabling the device.

The above-described embodiment of activatable devices including one or more adhesive layers offer several possible benefits including, but not limited to, cheaper production, fewer components, and easier assembly and manufacture of the devices to name a few. For example, the electrical traces and contacts may be formed using conductive ink, etched electrodes, and/or an electrically conductive adhesive may be used. Such a device may also be easy to use since it does not require a person to have the hand strength to firmly attach a connector to provide an electrical connection.

Figure 8:
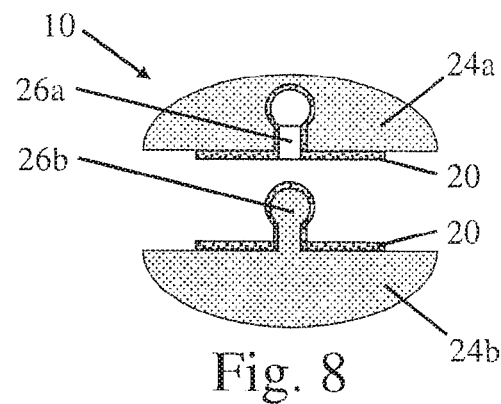
FIG. 8 depicts a cross-sectional view of mating portions of a connector including metallized electrical contacts.

FIG. 8 presents one possible embodiment of an interlocking connector, which in the depicted embodiment is a snap connector. In some applications, the different portions of such a connector may be used as one or more electrical contacts within a circuit. In the depicted embodiment, the connector 10 includes first and second mating portions 24a and 24b with corresponding interlocking features 26a and 26b. While any particular arrangement of interlocking features and mating portions may be used, in this particular embodiment, the connector 10 includes corresponding halves of a flattened ellipsoid shape with a protrusion including a shaft and enlarged ball extending outwards from one of the ellipsoid halves. The mating portion of the connector 10 has a similarly sized and shaped cavity that accepts the protrusion. The connector 10 is made from an appropriate material and has dimensions such that it is capable of accepting the protrusion into the cavity to connect the two portions 24a and 24b of the connector 10 together. Depending on the particular embodiment, the cavity and protrusion may be sized and shaped such that the connector is either a reusable connection or a permanent connection as the disclosure is not limited in this regard. The connector 10 also includes one or more electrical contacts 20 formed on one or more portions of each of the two matable halves of the connector 10. For example, the electrical contacts 20 may either be formed on portions of the mating halves of the connector that are proximate to one another when in the connected state, or the electrical contacts may be applied to the entire surface of the connector as the disclosure is not so limited. In instances where the conductive material forming the electrical contacts is only applied to a portion of the connector, the conductive material may be positioned on portions of the connector that are not exposed when the connector is in the connected state. For example, as illustrated in the figures, the electrical contacts 20 are formed on the internal surfaces of the connector 10 and thus are shielded from external contact and/or interference while in the connected state.

While coated connectors are described above, in some embodiments, the connector may simply be made from a conductive material negating the need for a separate conductive layer to be applied to the connector to act as an electrical contact. As described in the above noted embodiments, the separate halves of the connector may either be attached to the same electrical trace and/or different electrical traces of a device depending on the particular application. Additionally, in some embodiments, multiple electrical traces may be attached to separate unconnected electrical contacts formed on different portions of a connector. One exemplary embodiment of such a configuration includes a first connector half including two separate electrical contacts formed thereon and a second connector half with an electrical contact that bridges the other electrical contacts when the two halves are connected.

While particular types of connectors and arrangements have been described above, it should be understood that any appropriate connector capable of attaching a device to an object may be used as previously noted. Additionally, the connectors may either include electrical contacts in their construction, or they may simply be used to hold electrical contacts proximate to one another, as the disclosure is not so limited.

FIGS. 9A-11B illustrate different embodiments of permanent activation mechanisms. In general, the depicted embodiments are directed to an activation mechanism 100 that includes a first electrical contact 112*a* that is displaced towards a second electrical contact 112*b* that it is initially distanced from in order to place the electrical contacts 112*a* and 112*b* in electrical communication with one another. In some embodiments, the described activation mechanisms also include at least one adhesive layer 114, which may be arranged in any number of different configurations, to hold the first electrical contact 112*a* in the displaced configuration and maintain the electrical contacts 112*a* and 112*b* in electrical communication with one another.

Figure 9A:
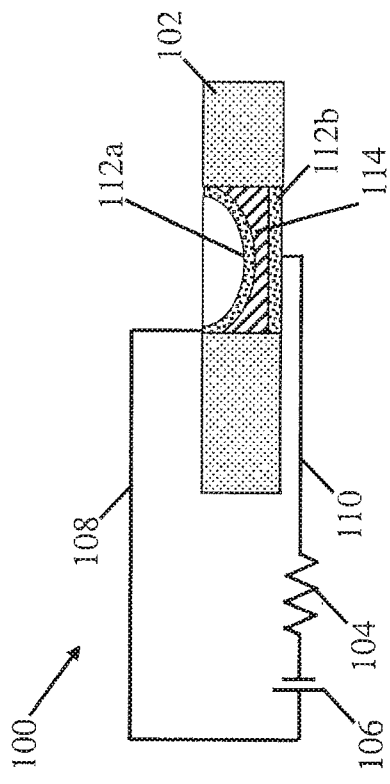
FIG. 9A is a cross-sectional view of an activation mechanism including a first electrical contact in the form of a depressible dome that is displaceable towards a second electrical contact and a conductive adhesive located between the two electrical contacts.
Figure 9B:
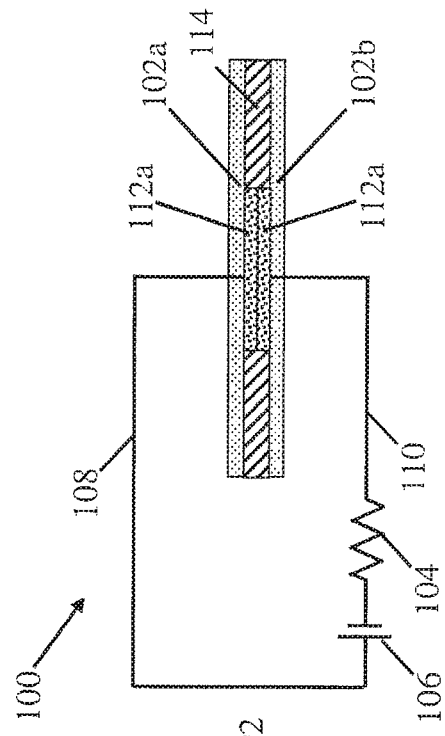
FIG. 9B is a cross-sectional view of the activation mechanism of FIG. 9A in the depressed state.

An embodiment of an activation mechanism 100 is depicted in FIGS. 9A and 9B. In the depicted embodiment, the activation mechanism is formed on, or within, a substrate 102. An associated electrical load 104 and power source 106 are electrical communication with separate first and second electrical traces 108 and 110. The first electrical trace is in electrical communication with a first electrical contact 112*a* which is in the form of a deformable feature. In this specific embodiment, the deformable feature is a protrusion in the shape of a dome that is displaced inwards when actuated by a user similar to a typical dome switch. However, different shapes, sizes, and configurations of a deformable feature/protrusion are also contemplated. The second electrical trace is in electrical communication with a second electrical contact 112*b* that is aligned with the first electrical contact 112*a*. The activation mechanism 100 also includes one or more adhesive layers associated with the electrical contacts. In this particular embodiment, the one or more adhesive layers are made from a conductive adhesive and are disposed on one or more of the opposing surfaces of the electrical contacts 112*a* and 112*b*, and thus are disposed between the electrical contacts 112*a* and 112*b*. Consequently, when the dome corresponding to the first electrical contact 112*a* is displaced inwards by a force P, the first and second electrical contacts are engaged by the adhesive layer 114 and held in the displaced configuration as shown in FIG. 9B. In such an arrangement, electrical communication between the electrical contacts 112*a* and 112*b* is provided through the electrically conductive adhesive 114.

In the above embodiment, it should be understood that the deformable feature, e.g. the depressable dome described above, may be made from any appropriate material. For example, a deformable feature such as a deformable protrusion may be made from a metal, a conductive plastic, a composite such as a plastic composite with a conductive filler, materials coated with a conductive material, and/or any other appropriate material capable of being deformed to create an electrical connection in an activation mechanism.

Figure 10A:
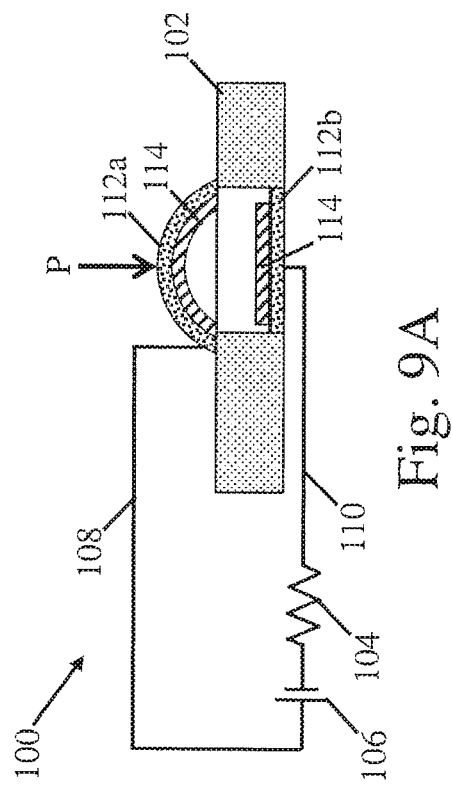
FIG. 10A is a cross-sectional view of an activation mechanism including two electrical contacts biased towards one another with an insulating strip located between them.
Figure 10B:
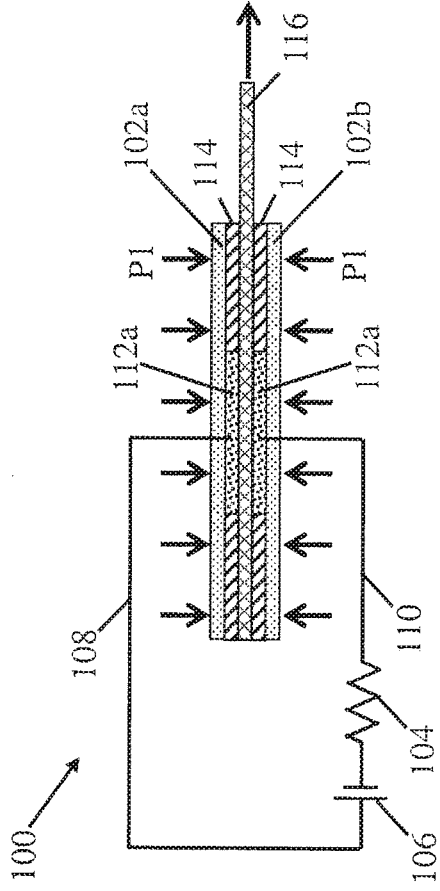
FIG. 10B is a cross-sectional view of the activation mechanism of FIG. 10A with the insulating strip removed from between the two electrical contacts such that the associated adhesive layers are engaged to hold the electrical contacts in electrical communication.

FIGS. 10A and 10B present another embodiment of a permanent activation mechanism 100. The mechanism 100 includes first and second opposing substrates 102*a* and 102*b*. In this particular embodiment, at least one of the substrates is biased towards the other as indicated by the forces P1 shown in the figure. Similar to the previous embodiment, the activation mechanism 100 may be associated with an electrical load 104 and power source 106 which are placed in electrical communication with electrical contacts 112*a* and 112*b* via first and second electrical traces 108 and 110 respectively. The electrical contacts 112*a* and 112*b* are either disposed on, or arranged in, a surface of the opposing substrates such that they are aligned with one another. The activation mechanism 100 also includes one or more adhesive layers 114 disposed on one or more portions of the substrates 102*a* and 102*b*. An insulator 116, such as an insulating strip, is initially disposed between the electrical contacts, substrates, and one or more adhesive layers. The insulator 116 includes a portion that protrudes out from the activation mechanism 100 and is sized and shaped to be grasped, or otherwise engaged, by a user.

When a user desires to activate the electrical load 104 and power source 106 associated with the activation mechanism 100, the user grasps the insulator 116 and removes it using a force P2. Once the insulator 116 is removed from between the opposing electrical contacts and substrates, at least one of the opposing substrates 102*a* and 102*b* is displaced towards the other by biasing force P1 bringing the electrical contacts 112*a* and 112*b* into electrical communication with one another activating the electrical load 104 and power source 106 in addition to engaging the substrates 102*a* and 102*b* with the associated one or more adhesive layers 114. Once engaged, the one or more adhesive layers 114 help maintain the substrate and associated electrical contacts in the displaced configuration to maintain the activation mechanism in the activated state. In some embodiments, the biasing force P1 is sufficient to maintain the electrical contacts 112*a* and 112*b* in electrical communication with one another. In such an embodiment, the one or more adhesive layers 114 may be omitted.

The above noted biasing force may be applied using any appropriate arrangement of features including, but not limited to: coil springs arranged to apply forces to the substrates; elastic members such as flexible arm's formed out of an elastic material and arranged to apply forces to the substrates; compressed elastic materials positioned on the exterior sides of the substrates; or any other appropriate arrangement of features capable of biasing one or more of the substrates towards one another.

FIGS. 11A and 11B depict yet another embodiment of an activation mechanism 100 associated with an electrical load 104 and power source 106. The activation mechanism 100 is again in formed on, or within, a substrate 102. The mechanism 100 also includes a deformable feature such as dome 118. A first electrical contact 112*a* is initially supported such that it is distanced from a second electrical contact 112*b* by an associated deformable support 120. Depending on the embodiment, the deformable support 120 may correspond to a stiff wire, a flexible arm biased in a direction away from the second electrical contact 112*b*, or any other appropriate feature of capable of being deformed and supporting the first electrical contact 112*a* in its initial position distanced from the second electrical contract 112*b*. Additionally, the first electrical contact 112*a* may be a foil, flexible conductive film, flexible electrical trace, or any other appropriate component capable of providing electrical communication with the second electrical contact 112*b* and being deformed. In some embodiments, it may be desirable to prevent contact between portions of the electrical contacts adjacent one another. In such an embodiment, an insulator 116, such as an insulating film, may be disposed at one or more positions between the electrical contacts 112*a* and 112*b*. Further, the electrical contacts 112*a* and 112*b* may extend beyond the insulator 116 such that at least one or more portions of the electrical contacts 112*a* and 112*b* may be brought proximate one another to provide electrical communication there through. In some embodiments, it may be desirable to hold the electrical contacts 112*a* and 112*b* proximate one another after being actuated. Therefore, in such an embodiment, one or more electrically conductive adhesive layers 114 may be located on opposing surfaces of the electrical contacts 112*a* and 112*b*, or otherwise disposed between, the electrical contacts 112*a* and 112*b*.

During actuation, the dome, or other appropriate deformable feature, is displaced by a force P. As the dome is deformed, the deformable support 120 and associated first electrical contact 112a are moved towards the second electrical contact 112b until the electrical contacts 112a and 112b are proximate to one another and are engaged with the associated adhesive layers 114. The adhesive layers 114 prevent the electrical contacts 112a and 112b from subsequently separating from one another when the dome returns to its original undeformed configuration shown by the return force R. Thus, the activation mechanism 100 provides a permanent electrical connection after actuation.

In some embodiments, a dome, or other deformable features, may be incorporated that does not return to its original, undeformed configuration. Instead, the domed feature may remain in contact with the deformable support 120 and in its deformed state. In some embodiments, this domed activation mechanism may be incorporated with a snap or other appropriate fastening device.

In the above embodiments, a permanent activation mechanism has been described as being associated with a power source and electrical load. However, it should be understood that a permanent activation mechanism may be used in any number of different applications including applications that do not include being directly connected to a power source and/or electrical load. For example, in one embodiment, a permanent activation mechanism may be integrated with a subportion of a system and/or circuit such that a particular function of that system and/or circuit is activated when the activation mechanism is actuated. Consequently, it should be understood that the presently described activation mechanisms should not be limited to only those embodiments described herein.

FIGS. 12A-13B depict embodiments of activatable communication devices. In the depicted embodiments, electrical contacts 210 and 212 are brought into electrical communication with one another to enable and/or disable various portions of the activatable communication devices. For the sack of clarity, radio frequency identification devices are depicted in the figures and described below. However, it should be understood that the described embodiments may be applied generally to other communication devices as well. For example, appropriate communication devices include, but are not limited to, radio frequency identification (RFID) devices, near field communication devices (NFC), blue tooth devices, wireless communication chips, and/or any other appropriate communication devices. Specific embodiments are described further below.

FIGS. 12A and 12B depict one embodiment of a device including an activatable radio frequency identification device 200. The device includes an antenna coil 204 and a circuit 202. In this particular embodiment, the antenna coil 204 is in electrical communication with the circuit 202. However, in a first operating state, depicted in FIG. 12A, at least one portion of the circuit 202 is in an initially disconnected state due to a first electrical trace 206 and associated first electrical contact 210 not being in electrical communication with a second electrical trace 208 and associated second electrical contact 212. When it is desired to activate the device, the first and second electrical contacts 210 and 212 are brought together to form a closed connection 214 as illustrated in FIG. 12B where the device 200 is in a second operating state where the circuit 202 is enabled. The electrical contacts 210 and 212 may be brought into electrical indication with one another in an appropriate manner. For example, switches as well as activation mechanisms and activatable devices as described herein might be used to activate an RFID device. However, other components capable of selectively connecting the electrical contacts may also be used.

FIGS. 13A and 13B illustrate another embodiment of an activatable radio frequency identification device 200. However, in this embodiment, the first and second electrical contacts 210 and 212 are in electrical communication with a first electrical trace 206 connected with a circuit 202 and a second electrical trace 208 connected to an antenna coil 204 respectively. Thus, the electrical contacts 210 and 212 are disposed between the circuit 202 and the antenna coil 204 in an initial open operating state (shown in FIG. 13A) where the electrical contacts 210 and 212 are not in electrical communication with one another and the antenna coil 204 is separated from the associated circuit 202 disabling the radio frequency identification device 200. In a second operating state, shown in FIG. 13B, the first and second electrical contacts 210 and 212 are brought into electrical communication with one another in any appropriate manner as previously described. Once the electrical contacts 210 and 212 are brought into electrical communication with one another, as shown by the closed connection 214 shown in FIG. 13B, the antenna coil 204 and the associated circuit 202 are placed into electrical communication with one another enabling the radio frequency identification device 200.

In the above noted embodiments of a radio frequency identification device, the electrical contacts 210 and 212 may undergo a permanent activation, i.e. once the electrical contacts are placed in electrical communication with one another they may not be separated during normal operation without damaging the device. Alternatively, in some embodiments, a connection between the electrical contacts of a radio frequency identification device may be repeatedly moved between an open and closed configuration to selectively enable and disable the device. Further, depending on the particular application, the radio frequency identification device may include a passive radio frequency identification circuit and/or an active radio frequency identification circuit as the disclosure is not so limited.

Once activated a radio frequency identification device 200 may be identified and read. For example, in one embodiment, an activated RFID device is identified and read with an area reader system 216 as shown in FIG. 14, though local readers may also be used. In some instances, the area reader system 216 may record information related to the radio frequency identification device 200 and transmit the information to an associated database 218 which may either be onsite or remotely located. Depending on the embodiment, the database 218 may be a cloud based database that may be remotely viewed and/or manipulated by a user. For the purposes of this application, a database may be considered one or more processors coupled with memory capable of storing the transmitted information for subsequent use and/or manipulation.

Figure 15A:
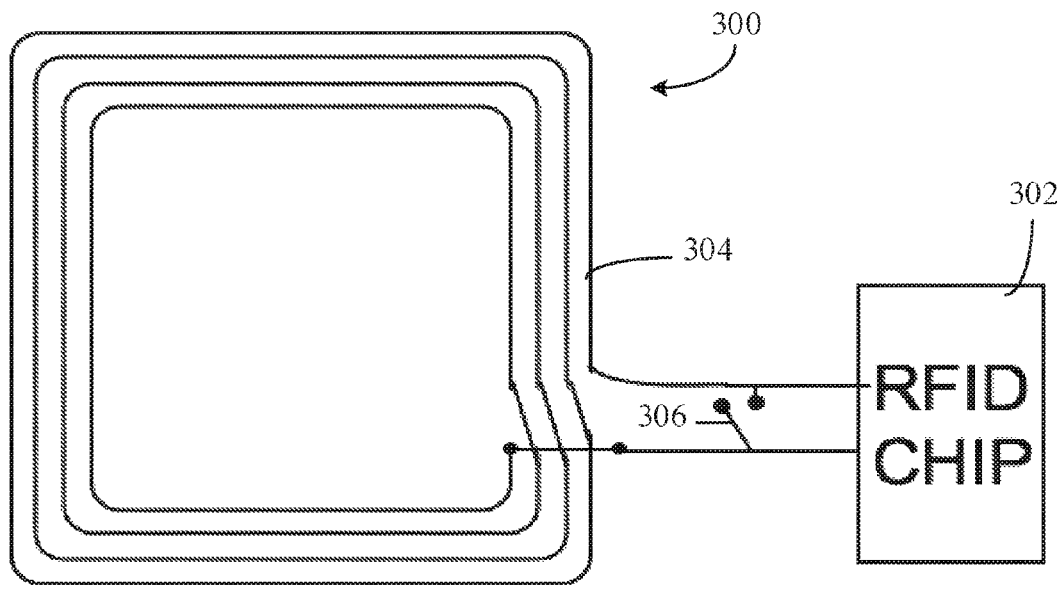
FIG. 15A is a schematic view of an implementation of an activation mechanism with a switch and an RFID chip in parallel with one another.
Figure 15B:
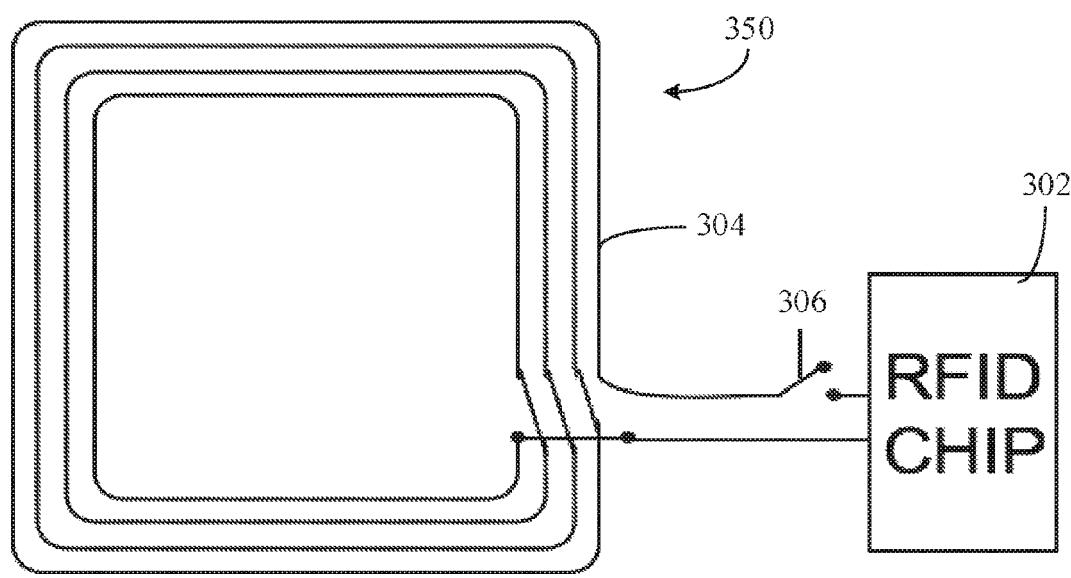
FIG. 15B is a schematic view of an implementation of an activation mechanism with a switch and an RFID chip in series with one another.

FIGS. 15A and 15B show a schematic diagram of an example circuit 300 that includes an RFID chip 302, an antenna 304, and a switch 306. While the example shows an RFID chip, other devices such as an NFC chip or another transceiver device may also be used. The switch 306 may, in some embodiments, include a mechanical interrupt (e.g. a pull tab, insulator, etc.), an electrical switch (e.g. a MOSFET, another type of transistor), or an electromechanical device (e.g., a manual switch) that causes an electrical separation between the RFID chip 302 and the antenna 304. The switch 306 may be activated by a control signal or a mechanical force. FIG. 15A shows the circuit 300 in a first configuration where the antenna 304 is activated. In FIG. 15A, because the switch 306 is in parallel with RFID chip 302, closing the switch 306 moves the circuit into a second configuration that deactivates the antenna 304 by creating a short-circuit between the two ends of the antenna 304. FIG. 15B shows a schematic example of another example circuit 350 where the antenna 304 is connected in series with the RFID chip 302. In the configuration shown in FIG. 15B, the switch 306 is open, and hence the antenna is deactivated. This can be referred to as the second configuration of the circuit 350. Closing the switch 306 moves the circuit 350 into a first configuration where the antenna 304 is activated by being electrically connected to the RFID chip 302.

The RFID and other devices described in this document may exhibit several advantages. For example, an RFID device would not be observable by a local, or area, reader, until it is activated. Therefore, the activation and/or presence of an enabled radio frequency identification device may be used to track the location, presence, and/or occurrence of an event or object. For example, an activated RFID device attached to a piece of inventory may be used to actively track the presence and location of inventory within a warehouse or store. Thus, an active tracking/wireless overlord type of system may be implemented to automatically track the RFID devices and utilize the corresponding information. Such a system may offer the benefit that only deployed, mounted, or otherwise activated devices would be sensed. Therefore, it would be unnecessary to log or shield RFID devices that are not currently in use. The presently disclosed RFID devices may also beneficially permit the use of RFID devices to be limited to situations where an associated object the RFID device is attached to is unsecured. For instance, currently RFID tags may be placed on every container or product when it is brought into a store or facility where it is used or displayed. However, with the currently described RFID devices, a user may choose to only apply activated RFID devices to objects that are located in unsecured areas such as where the object is accessible by multiple people and/or the public such as when inventory is placed on shelves for customers to view and handle.

The activatable radio frequency identification devices described herein, may be combined with the other activatable devices and/or permanent activation mechanisms also described herein. For example, an activatable device including two or more electrical contacts that are brought into electrical communication with one another to activate the device as described above, may also include an activatable radio frequency identification device. In such an embodiment, the electrical contacts of the radio frequency identification device may either be activated separately from the activatable device, or the electrical contacts of the activatable device and activatable radio frequency identification device may either be combined and/or associated with the same connection features. In one such an embodiment, mating the corresponding connection features of an activatable device may activate both the activatable device and the associated activatable radio frequency identification device at the same time. In addition to the above, the activation mechanism associated with an activatable radio frequency identification device may be a permanent activation mechanism as described herein, or the activation mechanism may be repeatedly moved between an open and closed state to selectively enable or disable the activatable radio frequency identification device as the disclosure is not limited in this fashion.

While the above description describes the technology primarily with respect to general RFID devices, other types of devices may also be within the scope of this document. For example, the technology described herein can be extended for specific types of RFID devices such as near-field communication (NFC) devices. During regular operation of a NFC system, the power harvested by a chip embedded in an NFC tag can depend on, for example, an output power of the reader, a coupling factor between the reader and the tag antennas, and the power transferred from the tag antennas to the chip. In some implementations, the power harvested by the chip exceeds a threshold value to cause the NFC tag to function. In some implementations, the power harvested can be larger than the threshold value by a target power margin.

In some implementations, in order to allow switching between undetectability in an unactivated state and detectability in an activated state, a mechanical interrupt may be inserted between the NFC chip and the antenna. In such cases, the mechanical interrupt attenuates power transfer between the antenna and the NFC chip such that the attenuation is smaller than the power margin for the activated state and larger than the power margin for the unactivated states. Resistive impedances (which in mathematical terminology, may be referred to as real impedances) can lower the power transfer and change the quality factor of the resonator formed by the tag. Inductive or capacitive inductances (which in mathematical terminology may be referred to as imaginary impedances) can change the center frequency of the tag, which, in some cases, may reduce the tag's readability. For example, if the frequency of operation of an NFC system is fixed at 13.56 MHz, insertion of a mechanical interrupt can move the center frequency of the tag to a value at which the tag becomes unreadable or undetectable by an NFC reader. In some embodiments, the power margin is between 3 and 6 dB at the limit of separation (e.g. the distance between the tag and the reader are near the maximum operative distance). In some embodiments, the power margin may be between 6 and 10 dB. In other embodiments, the power margin may be 10 dB or larger. In embodiments, the power margin may be 20 dB and the load resistance is greater than 900 Ohms. In embodiments with complex loads a capacitance of 12 pF or larger or an inductance of 10 μH or smaller would also prevent the tag from operating in an unactivated state.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

What is claimed is:

1. A radio frequency identification (RFID) device comprising:
   an RFID tag configured to store identification information;
   an antenna configured to support radio frequency (RF) communications;
   circuitry coupled to the antenna and the RFID tag, the circuitry configured to send and receive RF communications using the antenna;
   a display configured to present an output of a timer;
   an activation mechanism comprising a first electrical contact and a second electrical contact, the activation mechanism disposed in the RFID device such that:
      in a first configuration of the activation mechanism, the circuitry is electrically connected to the antenna through the first and second electrical contacts to enable RF communications using the antenna, and
      in a second configuration of the activation mechanism, an electrical connection between the antenna and the circuitry through the first and second electrical contacts is insufficient for supporting RF communications through the antenna,
wherein placing the activation mechanism in the first configuration initiates the output of a timer on the display; and
a deactivation mechanism comprising a switch disposed between the antenna and the RFID tag, the deactivation mechanism being separate from the activation mechanism, and disposed in the RFID device such that:
in a first configuration of the deactivation mechanism, the switch connects the RFID tag to the antenna such that the identification information can be stored in or read from the RFID tag by an external device, and
in a second configuration of the deactivation mechanism, the switch creates an electrical separation between the RFID tag and the antenna such that the identification information stored in the RFID tag is undetectable to an external device.

2. The RFID device of claim 1, wherein the activation mechanism is configured to allow the RFID device to be moved from the second configuration to the first configuration and resist the RFID device from being moved from the first configuration to the second configuration.

3. The RFID device of claim 1, wherein the activation mechanism comprises a wristband.

4. The RFID device of claim 1, wherein the circuitry comprises a passive RFID tag.

5. The RFID device of claim 1, wherein the circuitry comprises an active RFID tag that is powered by a power source.

6. The RFID device of claim 1, wherein the circuitry comprises a power source that is configured to provide operating power to the switch.

7. The RFID device of claim 6, wherein in the second configuration of the deactivation mechanism, a depletion of the power source causes the switch to be opened, thereby creating the electrical separation between the RFID tag and the antenna.

8. The RFID device of claim 7, wherein the switch comprises a metal-oxide semiconductor field effect transistor (MOSFET).

9. The RFID device of claim 8, wherein a gate of the MOSFET is driven by the power source.

10. The RFID device of claim 1, wherein the activation mechanism comprises a snap connector, and the first electrical contact and the second electrical contact are disposed on corresponding portions of the snap connector configured to attach to one another in a mating configuration.

11. The RFID device of claim 1, wherein the first electrical contact comprises a snap connector and the second electrical contact comprises a portion receivable by the snap connector.

12. The RFID device of claim 1, wherein at least one of the first electrical contact and the second electrical contact is integrated in a body of the RFID device.

13. The RFID device of claim 1, wherein in the second configuration of the activation mechanism, the first electrical contact and the second electrical contact are electrically separated by an insulator.

14. The RFID device of claim 13, wherein the insulator is integrated with a packaging component of the RFID device and is removable from the RFID device with the packaging component.

15. The RFID device of claim 1, wherein in the first configuration of the deactivation mechanism, the identification information is presented on the display, and wherein in the second configuration of the deactivation mechanism, the identification information is absent from the display.

16. A radio frequency identification (RFID) device comprising:
an RFID tag configured to store identification information;
a display configured to present an output of a timer;
an attachment mechanism comprising two mating portions configured to couple with one another in a first configuration to be attached to an object, the two mating portions comprising a first electrical contact and a second electrical contact, respectively, such that:
in the first configuration of the attachment mechanism, an electrical connection is formed through the first and second electrical contacts to enable the RFID tag, and
in a second configuration of the attachment mechanism, an electrical separation of the first and second electrical contacts disables the RFID tag,
wherein placing the activation mechanism in the first configuration initiates the output of a timer on the display; and
a deactivation mechanism, separate from the attachment mechanism, comprising a switch disposed between an antenna and the RFID tag, the deactivation mechanism disposed in the RFID device such that:
in a first configuration of the deactivation mechanism, the switch connects the RFID tag to the antenna such that the identification information can be stored in or read from the RFID tag is by an external device, and
in a second configuration of the deactivation mechanism, the switch creates an electrical separation between the RFID tag and the antenna such that the identification information stored in the RFID tag is undetectable to an external device.

17. The RFID device of claim 16 wherein the RFID tag is a passive RFID tag.

18. The RFID device of claim 16 wherein the RFID tag is an active RFID tag that is powered by a power source.

19. The RFID device of claim 18 wherein the electrical separation between the RFID tag and the antenna is triggered by a power level of the power source.

20. The RFID of claim 19 wherein the switch comprises a metal-oxide semiconductor field effect transistor (MOSFET).

21. The RFID device of claim 16 wherein the two mating portions comprise mating portions of a snap connector.

22. The RFID device of claim 16 wherein the attachment mechanism further comprises at least one adhesive layer.

23. The RFID device of claim 16, wherein the attachment mechanism is configured to allow the RFID device to be moved from the second configuration to the first configuration and resist the RFID device from being moved from the first configuration to the second configuration.

* * * * *